United States Patent [19]

Beernink et al.

[11] Patent Number: 5,666,438
[45] Date of Patent: Sep. 9, 1997

[54] METHOD AND APPARATUS FOR RECOGNIZING HANDWRITING OF DIFFERENT USERS OF A PEN-BASED COMPUTER SYSTEM

[75] Inventors: Ernest H. Beernink, San Carlos, Calif.; Donna M. Auguste, Lyons; John R. Meier, Longmont, both of Colo.

[73] Assignee: Apple Computer, Inc., Cupertino, Calif.

[21] Appl. No.: 282,785

[22] Filed: Jul. 29, 1994

[51] Int. Cl.$^6$ ............................................. G06K 9/00
[52] U.S. Cl. ........................ 382/189; 382/161; 382/187
[58] Field of Search ........................ 382/161, 155, 382/186, 187, 189

[56] References Cited

U.S. PATENT DOCUMENTS

| | | | |
|---|---|---|---|
| 5,121,441 | 6/1992 | Chefalas et al. | 382/189 |
| 5,191,622 | 3/1993 | Shojima et al. | 382/161 |
| 5,265,174 | 11/1993 | Nakatsuka | 382/189 |
| 5,267,327 | 11/1993 | Hirayama | 382/161 |
| 5,343,537 | 8/1994 | Bellegarda et al. | 382/187 |
| 5,345,543 | 9/1994 | Capps et al. | 395/137 |
| 5,367,453 | 11/1994 | Capps et al. | 364/419.13 |
| 5,389,745 | 2/1995 | Sakamoto | 382/189 |

OTHER PUBLICATIONS

O'Connor, Rory J., "Apple Banking on Newton's Brain", Apr. 22, 1992, San Jose Mercury News.
Weiman, Liza and Moran, Tom, "A Step Toward the Future", Aug. 1992, Macworld Magazine.
Soviero, Marcelle M., "Your World According to Newton", Sep. 1992, Popular Science Magazine.
Abatemarco, Fred, "From the Editor", Sep. 1992, Popular Science Magazine.
Cohen, Raines, "Slimmed-Down MessagePad to Beef up RAM, Recognition," Feb. 14, 1994, MacWeek, vol. 8, No. 7, pp. 1 and 84.

*Primary Examiner*—Leo Boudreau
*Assistant Examiner*—Chris Kelley
*Attorney, Agent, or Firm*—Hickman Beyer & Weaver

[57] ABSTRACT

A computer system and method capable of handwriting recognition and user identification are presented. The computer system includes a CPU, a dual-function display assembly and a stylus. The dual-function display assembly senses the relative position of the stylus with respect to the dual-function display. When an appropriate prompt is displayed, a user responds by application of the stylus to the dual-function display to enter user identity, handwriting, handwriting style, handwriting preferences, and other input to the computer system. Using user-specific handwriting preferences and data, improved handwriting recognition for the user is enabled.

40 Claims, 13 Drawing Sheets

72

PREFERENCES

* Personal
* Date and Time
* Locale
* Sound
* Sleep ← 171
* Memory
* Pen Alignment
* Recognizes
* Handwriting style ← 73
* Letter style ← 75
* Handwriting practice
* Bear
* Modem
* Mail

Preferences

Guest Handwriting Style ———————— 69

My handwriting style is
○ Cursive Only
○ Printed Only
● Mixed Cursive & Printed

My words are widely spaced    closely spaced

Recognize my handwriting slowly, more        fast, less
accurately          accurately Transform my handwriting immediately      after a delay —— 90

Configure for guest user ☑ — 78
                              80
87

Letter Styles ———————————— 76

74

Preferences

Guest Handwriting Style — 69

My handwriting style is
○ Cursive Only
○ Printed Only
● Mixed Cursive & Printed

My words are widely spaced    closely spaced

Recognize my handwriting slowly, more           fast, less
accurately             accurately

Transform my handwriting immediately         after a delay

91 — Enable Learning ○
93 — Save Handwriting Preferences ○

Letter Styles — 76

METHOD AND APPARATUS FOR RECOGNIZING HANDWRITING OF DIFFERENT USERS OF A PEN-BASED COMPUTER SYSTEM

BACKGROUND OF THE INVENTION

This invention relates generally to computer systems, and more particularly to hand-held computer systems which permit handwritten input via a dual-function display.

Computerized personal organizers are useful for storing, transporting and rapidly recalling information. Smaller hand-held organizers now fit easily in a pocket, a purse or a briefcase and can be brought to a meeting or used on a train, for example. Many people who, for example, organize schedules, make appointments, recall phone numbers and keep diaries rely on these devices daily.

In the past, computerized personal organizers have employed a keypad for information input. However, keypads associated with hand-held organizers are typically difficult to use. The keys are small, difficult to see, and cumbersome to operate. Computerized organizers capable of receiving handwritten input have recently been developed, in part, to answer these problems. These devices are referred to variously as pen-based computer systems, computerized notepads, personal digital assistants (PDA's), electronic personal organizers, etc.

Pen-based computers may rely on a pointer such as a stylus (sometimes referred to as a "pen") or a mouse to input desired information to the computer system. A stylus is typically preferred over the mouse because of enhanced portability and ease of use. Pen-based computers generally include a dual function display assembly which acts simultaneously as an input device ("input tablet") and as an output device. The display assembly typically includes a liquid crystal display (LCD) or other portable display having a matrix of pixels capable of displaying text, graphics, etc. A variety of different types of input tablets can be used, including a much sensitive membrane positioned over the LCD. The input tablet senses the position of the tip of the stylus on the viewing screen and provides this positional information to the computer's central processing unit (CPU). During output, the display assembly presents computer-generated images on the screen in the form of text, graphics, etc. These images are viewed by the user and may, for example, prompt a user to act or provide feedback to the user.

State-of-the art pen-based computers recognize handwritten text from the input tablet of the dual function display. Not infrequently, however, the pen-based computer fails to recognize handwritten words correctly. To enhance handwriting recognition, many pen-based computers employ adaptive handwriting learning. Through the use of a user-specific database, the pen-based computer adapts its handwriting recognition techniques to optimize user-specific handwriting recognition. The pen-based computer continually updates the user-specific database as the user inputs words into the computer system. Additionally, the computer system recalls handwriting style and letter style preference information previously input into the user-specific database by the user. With these techniques, the computer system better reads, converts and stores handwriting input (sometimes called electronic "ink") for a particular user.

Pen-based computers are useful, portable and greatly desired. An owner or primary user of such a device may often desire to share the pen-based computer with others. This causes at least two problems with handwriting recognition. First, the pen-based computer has greater difficulty in recognizing the guest user's handwriting because it has adapted its recognition ability to the primary user's handwriting. Second, during use by a guest, the pen-based computer adapts a handwriting recognition database to the guest's handwriting. After prolonged use by the guest, the recognition capability of the computer is less well adapted to the primary user's handwriting. Handwriting recognition can thus be degraded when different users operate the computer.

SUMMARY OF THE INVENTION

In accordance with a preferred embodiment of the present invention, a user-configured computer system with handwriting recognition capability is disclosed. The computer system includes a central processing unit (CPU), a dual function display assembly and a stylus. The dual-function display assembly includes a liquid crystal display (LCD) and an input tablet. The input tablet senses movement and position of the stylus and receives handwritten input. In response to an appropriate prompt such as an image provided on the LCD, the user communicates his or her identity to the computer system by application of the stylus to the input tablet at an appropriate toggle or button. With user identity known, user-specific data which is stored in the computer system and associated with the user optimizes recognition of handwriting input to the computer system by the user.

The computer system identifies the user as either a guest or a primary user via a guest user "toggle" presented as an image or icon on the LCD. The computer system operates in guest mode after a guest user actuates the guest user toggle. In guest mode, the computer system employs user-specific data associated with the guest user, or default data if user-specific data is not available, to recognize the handwriting of the guest user. The computer system operates in primary user mode otherwise. In primary user mode, the computer system similarly employs user-specific data associated with the primary user to recognize the handwriting of the primary user. Accordingly, data associated with one user will not interfere with learning and recognition of the handwriting of another user. The data format for each user includes adaptive learning data, which is collected and used by the recognizer to recognize a particular user's handwriting, and handwriting style data, which is input by the user to personalize the system to his or her style and type of handwriting. In consequence, handwriting recognition is optimized both for a primary user of the system and for one or more "guest" users of the system.

These and other advantages of the present invention will become apparent from the following detailed description of the invention when considered in conjunction with the accompanying drawings.

BRIEF DESCRIPTION OF THE DRAWINGS

FIG. 5 illustrates a basic preferences screen;

DETAILED DESCRIPTION OF THE PREFERRED EMBODIMENT

The present invention is particularly well suited for portable, pen-based computers which rely on stylus-based, mouse-based, or other pointer-based input. For the purposes of illustration, the present disclosure describes a preferred embodiment of the preset invention with reference to a hand-held stylus-based computer system.

Figure 1:
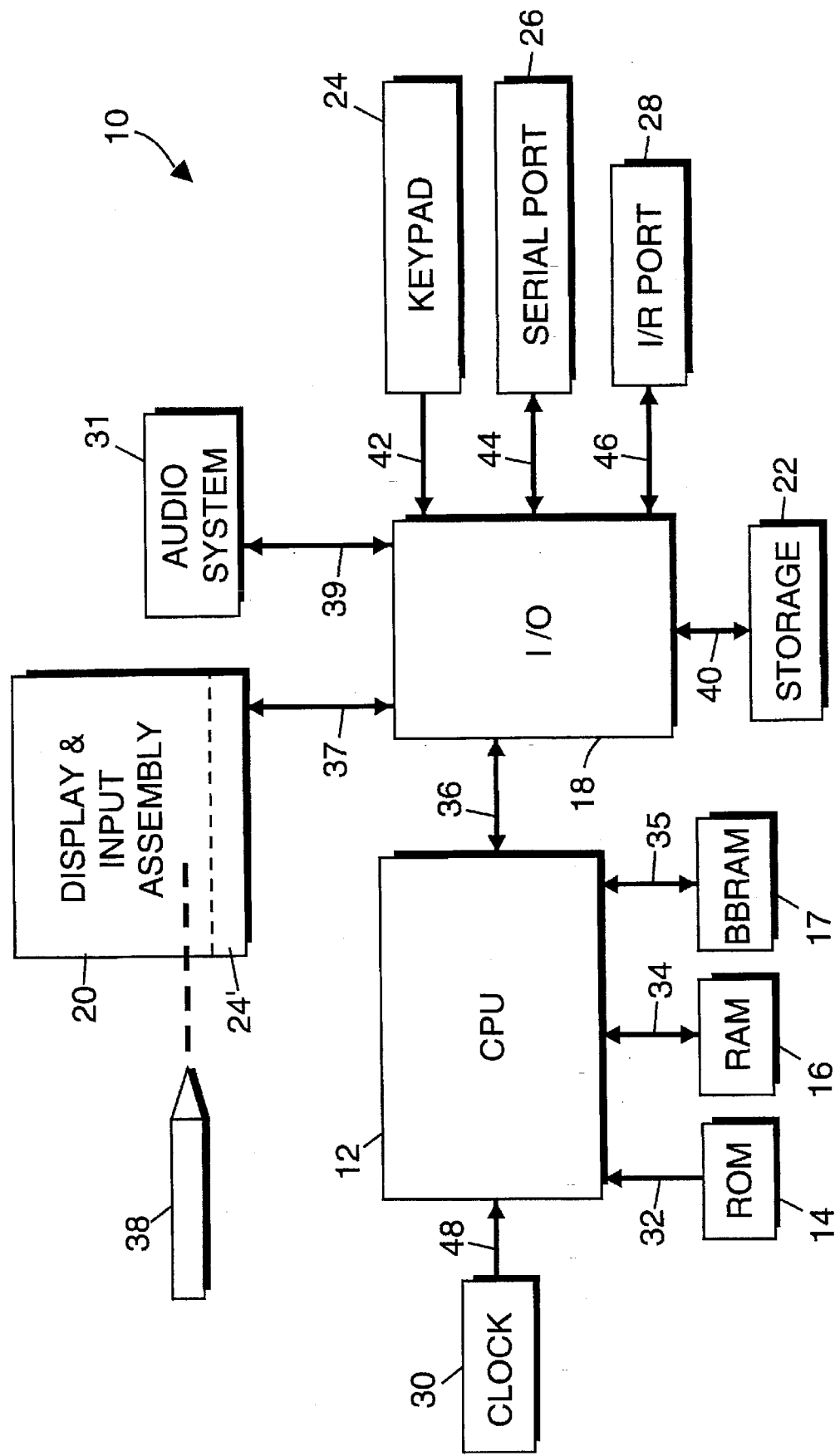
FIG. 1 is a block diagram of a pen-based computer system in accordance with the present invention.

As shown in FIG. 1, a pen-based computer system 10 in accordance with the present invention includes a central processing unit (CPU) 12, read only memory (ROM) 14, random access memory (RAM) 16, battery backed-up RAM (BBRAM) 17 which retains its memory contents even when the main system is powered off, input/output (I/O) circuitry 18, and a display assembly 20. The pen-based computer system 10 may also optionally include a mass storage unit 22, a keypad (or keyboard) 24, a serial port 26, an infrared (I/R) port 28, a clock 30, and an audio system 31.

CPU 12 is preferably a commercially available, single chip microprocessor. It is preferable that CPU 12 be one of the commercially available, reduced instruction set computer (RISC) chips which are known to be of generally higher performance than CISC chips. Alternately, CPU 12 is a complex instruction set computer (CISC) chip. CPU 12 couples with ROM 14, RAM 16 and BBRAM 17 via appropriate data busses. ROM 14 preferably stores the basic operating system for computer system 10. RAM 16 is employed by CPU 12 as a scratch pad memory for temporary storage of data. BBRAM 17 is non-volatile memory which stores data associated with a primary user and data associated with a guest user (described below). During operation, BBRAM 17 backs up data stored in RAM 16. When pen-based computer system is powered down, BBRAM 17 retains its data and provides this data to RAM 16 when power-up occurs. CPU 12 is coupled to I/O circuitry 18 by a bi-directional data bus to permit communication with peripheral devices such as display assembly 20, mass storage unit 22, keypad 24, and audio system 31.

I/O circuitry 18 typically includes a number of latches, registers and direct memory access (DMA) controllers. Display assembly 20, mass storage 22, keypad 24, serial port 26, I/R port 28, and audio system 31 are each coupled to I/O circuitry 18 by appropriate data buses and interface with CPU 12 using the I/O circuitry.

Display assembly 20 of pen-based computer system 10 is both an input and an output device. Accordingly, it is coupled to I/O circuitry 18 by a bi-directional data bus 37. When operating as an output device, the display assembly 20 receives data from I/O circuitry 18 via bus 37 and displays that data on a suitable screen. The screen for display assembly 20 is preferably a liquid crystal display (LCD) of the type commercially available from a variety of vendors. The input device of display assembly 20 is preferably a thin, clear membrane which covers the LCD display and which is sensitive to the position of a stylus 38 on its surface. With such a structure, the membrane of the display assembly 20 can serve as an input "tablet." These position sensitive membranes are also readily available on the commercial market. Alternatively, other types of tablets can be used, such as inductively coupled tablets. Combination display assemblies such as display assembly 20 which include both the LCD and the input membrane are commercially available from such vendors as Scriptel Corporation of Columbus, Ohio.

Some type of mass storage 22 is generally considered desirable. Mass storage 22 can be coupled to I/O circuitry 18 by a bi-directional data bus 40. However, the mass storage 22 can be eliminated by providing a sufficient amount of RAM 16 to store user application programs and data. In that case, the RAM 16 can be provided with a backup battery, such as in BBRAM 17, to prevent the loss of data even when the pen-based computer system 10 is turned off. However, it is generally desirable to have some type of long term mass storage 22 such as a commercially available miniature hard disk drive, nonvolatile memory such as BBRAM 17, flash memory, or a PCMCIA card, for example.

Figure 2:
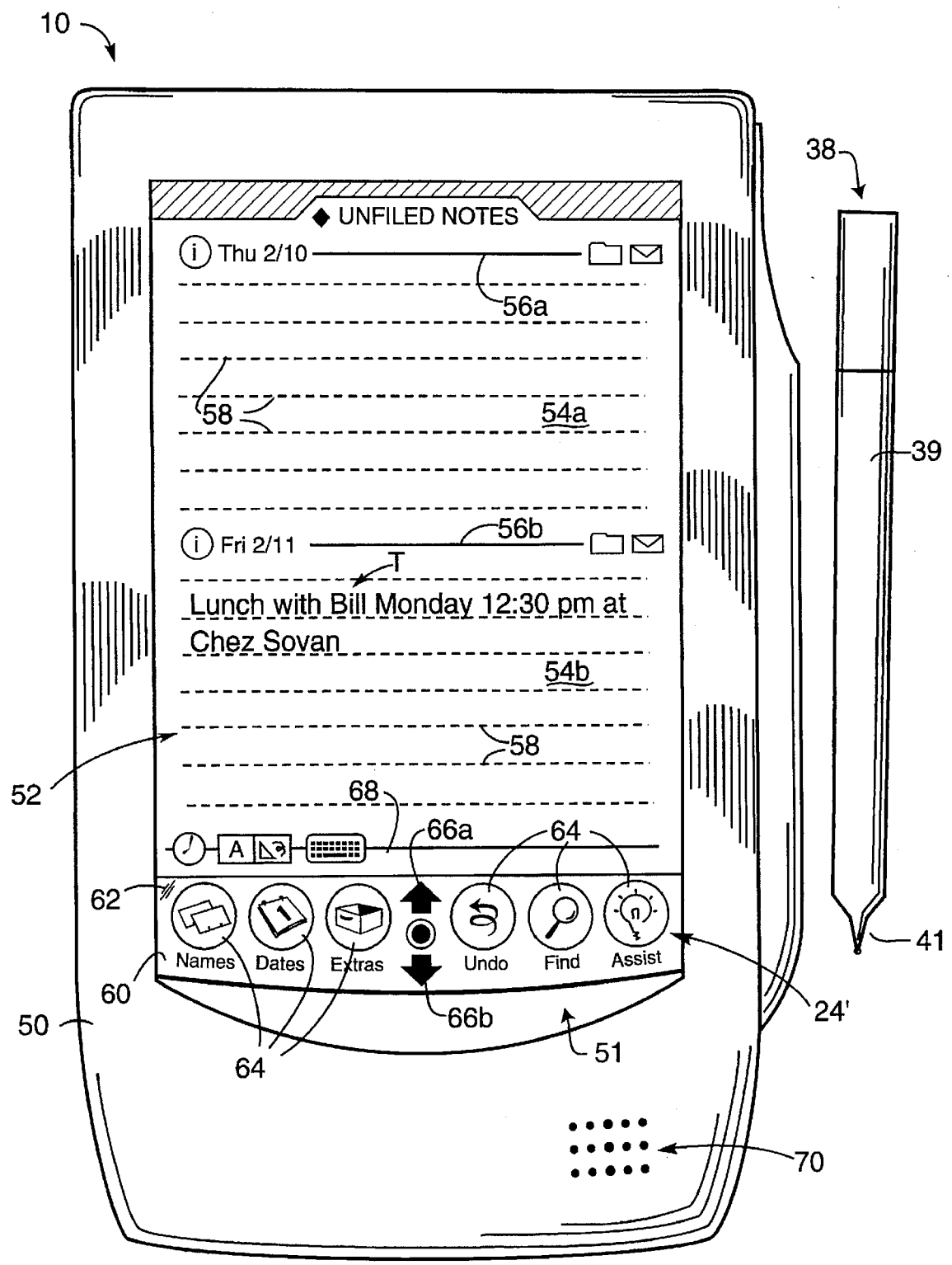
FIG. 2 is a top plan view of pen-based computer system of FIG. 1.

The keypad 24 can comprise an array of mechanical buttons or switches coupled to I/0 circuitry 18 by a data bus 42. Alternatively, keypad 24 can comprise an entire, standard QWERTY keyboard. In the present embodiment, a separate keypad 24 is not used in favor of a "pseudo" keypad 24'. This "pseudo" keypad 24' comprises "button" areas which are associated with a bottom edge of the tablet membrane that extends beyond the lower edge of the LCD display. These button areas are defined by a printed or silk-screened icons which can be seen through the transparent membrane of the input tablet. When the "buttons" are selected by engaging the stylus 38 with the membrane over these printed icons, the membrane senses the pressure and communicates that fact to the CPU 12 via data bus 38 and I/O 18. An example of pseudo keypad 24' is shown in FIG. 2.

Serial port 26 is coupled to I/O circuitry by a bi-directional bus 44. The serial port 26 can be used to couple the CPU to external devices and networks.

Infrared (I/R) port 28 is coupled to I/O circuitry by a bi-directional bus 46. The I/R port can be used for outgoing information (e.g. to control a printer or some other external device, or to communicate with other computer systems) or for incoming information from other computers or devices.

Clock 30 is coupled to CPU 12 by a data bus 48 and preferably comprises a real-time clock to provide real-time information to the system 10. Alternatively, clock 30 can simply provide regular clock pulses to, for example, an interrupt port of the CPU 12 which can count the clock pulses to provide the time function. However, this alternative clock embodiment tends to be wasteful of CPU processing power.

Audio system 31 including audio components and devices may be included with computer system 10 to permit audio communication when desired between computer system 10 and a user. An audio speaker, for example, is connected to CPU 12 for generating sound. The audio speaker can be driven by the CPU 12, by I/O circuitry 18 or by specialized sound chips as are well known to those skilled in the art. The speaker can be used as an output device to provide user feedback or prompt a user to action. It can be appreciated that the teaching of an audio system can include audio input as well as audio output in accordance with the present invention. For example, users can input their personal identifications to computer system 10 using audio input.

In operation, information is input into the pen-based computer system 10 by "writing" on the screen of display assembly 20 with the stylus 38. Information concerning the location of the stylus 38 on the screen of the display assembly 20 is input into the CPU 12 via data bus 38 and I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation, Sharp, and others include appropriate circuitry to provide the stylus location information as digitally encoded data to the I/O circuitry of the present invention. The CPU 12 then processes the data under control of an operating system and possibly an application program stored in ROM 14, RAM 16, or mass storage 22. The CPU 12 next produces data which is transferred to the display assembly 20 via I/O circuitry 18 and data bus 38 to produce appropriate images on the screen portion of the display assembly 20. If these images are simply a line of pixels corresponding to a stroke of a stylus, they are referred to as electronic "ink." CPU 12 communicates with audio system 30 via I/O circuitry 18 to receive input and to generate sound.

Referring to FIG. 2, pen-based computer system 10 of FIG. 1 is shown housed within a generally rectangular enclosure 50. The CPU 12, ROM 14, RAM 16, I/O circuitry 18, and clock 26 are preferably fully enclosed within the enclosure 50. Display assembly 20 (FIG. 1) is mostly enclosed within housing 50, but viewing screen 52 of the display assembly is exposed to the user. As used herein, the term "screen" will refer to the portion of the display assembly 20 which can display an image that can be viewed by a user. Housing 50 includes a recessed face 51 which securely supports display assembly 20 to accept handwriting applied against viewing screen 52 by stylus 38. Also accessible to the user is the pseudo keypad 24' that was described with reference to FIG. 1.

Upon power-up, pen-based computer system 10 displays on screen 52 an initial "note" area 54a including a header bar 56a and a number of guidelines 58. Alternatively, other displayed images may be selected by the user by applying stylus 38 to an appropriate prompt such as a toggle or button displayed on screen 52 or in keypad 24. The header bar 56a preferably includes the date of creation of the note area 54a and a number of icons and "soft" buttons, not particularly germane to the discussion of the present invention. For this reason, the header bar 56a will not be discussed in detail herein. The optional guidelines 58 aid a user in entering text, graphics, and data into the pen-based computer system 10.

Additional note areas, such as a note area 54b, can be formed by the user by drawing a substantially horizontal line across the screen 52 with the stylus 38. The substantially horizontal line is recognized by the system 10 and is converted into a second header bar 56b. Additional text, graphical, and other data can then be entered into this second note area 54b. For example, the text object T is a phrase that has been entered into second note area 54b. In the described embodiment, text object T was originally entered as several strokes of handwritten "ink" which were recognized by the CPU and converted into printed words of the object T.

In this preferred embodiment, the keypad 24', as explained previously, comprises a printed or silk-screened member 60 provided beneath a lower edge of a thin, clear, stylus-sensitive membrane 62 of the input "tablet." Alternatively, a keypad could comprise a mechanical keypad (or keyboard) 24, or a keypad could comprise "soft buttons" i.e. images generated at convenient locations on the screen 52, in which case a "button" would be activated by touching the stylus to the screen over the image of the button. The keypad 24' preferably includes a number of dedicated function buttons 64 and a pair of scroll buttons 66a and 66b. Buttons 64 and 66 are spaced across keypad 24 to permit equally easy access for both right- and left-handed users. The buttons are appropriately sized to permit selection by the digit of a user, if desked. The operation of the note areas 54a, 54b, etc., scroll buttons 66a and 66b, and other aspects of computer system 10 are discussed in greater detail in U.S. Pat. No. 5,398,310 which is incorporated herein by reference in its entirety. In addition, other suitable input devices, well-known in the art and adapted for use with multiple users, may be combined with display assembly 20.

The screen illustrated in FIG. 2 is referred to as the "notepad", and is preferably an application program running under the operating system of the pen-based computer system 10. In this preferred embodiment, the notepad is a special or "base" application which is always available beneath higher level applications. The notepad application, like other applications, run within a window, which in this instance comprises the entire viewing screen 52. Therefore, as used herein, a "window" is the entire screen or any portion of an entire screen which is dedicated to a particular application program.

A status bar 68 is provided at the bottom of the notepad application. The status bar 68 is provided with a number of active and display areas, which again are not particularly germane to the present invention and will therefore not be discussed in detail herein. U.S. patent application Ser. No. 07/976,970 filed Nov. 16, 1992 on behalf of Foster et. at, entitled "Status Bar for Application Windows" and assigned to the assignee of the present invention describes how to make and use the status bar, and is incorporated herein by reference in its entirety.

The enclosure 50 is preferably provided with apertures 70 which permit the free transmission of sound from a speaker of audio system 31 which is housed within enclosure 50. The speaker can be used to provide user feedback, or to transmit audible information to a user. Alternatively, apertures 70 and the speaker can be used as a dual function speaker/microphone.

It will be noted there is a liberal use of graphic elements in the present invention. For example, the header bars 56a and 56b include lines and other graphical elements. Processes for drawing lines on a computer screen are well known to those skilled in the art. For example, graphics software such as QUICKDRAW from Apple Computer, Inc. of Cupertino, Calif. can be used to draw lines, simple geometrical shapes, etc. A description of the QUICKDRAW graphics software is found in the book *Inside Macintosh, Volumes I, II, and III,* by C. Rose et at., Addison-Wesley Publishing Company, Inc., July 1988. With such graphics software, a line can be drawn by simply specifying the coordinates of the beginning and the end of the line, and by specifying the width of the line.

Another preferred tool for implementing the system of the present invention is a view system. Various types of view systems are well known to those skilled in the art. In the present system, the notepad application on the screen 52 forms a first or "root" layer, with the status bar 68, for example, positioned in a second layer "over" the root layer. The various buttons of the status bar 68 are positioned in a third layer "over" the second and root layers. The view system automatically handles "taps" and other gestures of the stylus 38 on the screen 52 by returning information concerning the tap or gesture and any object to which it may be related. Again, the status bar 68 and the view system is described in greater detail in co-pending U.S. patent application 07/976,970, which has been incorporated herein by reference. It is therefore clear that the object oriented programming and view system software makes the implementation of the processes of the present invention less cumbersome than traditional programming techniques. However, the processes of the present invention can also be implemented in alternative fashions, as will be well appreciated by those skilled in the art.

The present invention makes use of a recognizer implemented by CPU 12 to recognize ink strokes input by a user with stylus 38. The recognizer analyzes the entered ink and attempts to match the ink to a letter, word, shape, or other symbol present in a database accessible to the recognizer. The database can be implemented in memory such as RAM 16 or mass storage 22. Recognition software which performs such functions is well known to those skilled in the art. A preferred recognizer for use with the present invention appears in co-pending U.S. patent application No. 08/265, 497 filed Jun. 23, 1994 by Beernink et al., which is entitled "Method and Apparatus for Recognizing Handwritten Words", is assigned to the assignee of the present invention and is incorporated herein by reference. Additional information describing a suitable handwriting recognition process is described in co-pending U.S. patent application No. 08/001,123 filed Jan. 5, 1993 by Giulia Pagallo et al., titled "Method and Apparatus for Computerized Recognition", which is assigned to the assignee of the present invention and incorporated herein by reference.

Stylus 38 has an elongated hand grip 39 which is appropriately textured to permit application of a desired amount of pressure by a user against the input tablet of display assembly 52. More particularly, pointed end 41 impresses upon screen 52 and thereby communicates with CPU 12 as directed by the user.

Although a stylus 38 is described in the preferred embodiment of the present invention, any pointing device may be employed in accordance with the present invention and may include, for example, a mouse device, trackball, etc. It can also be appreciated that a pressure sensitive input tablet is disclosed herein by way of example only. Alternate input devices sensitive to the position of a pointing device may be employed in accordance with the present invention.

Figure 3:
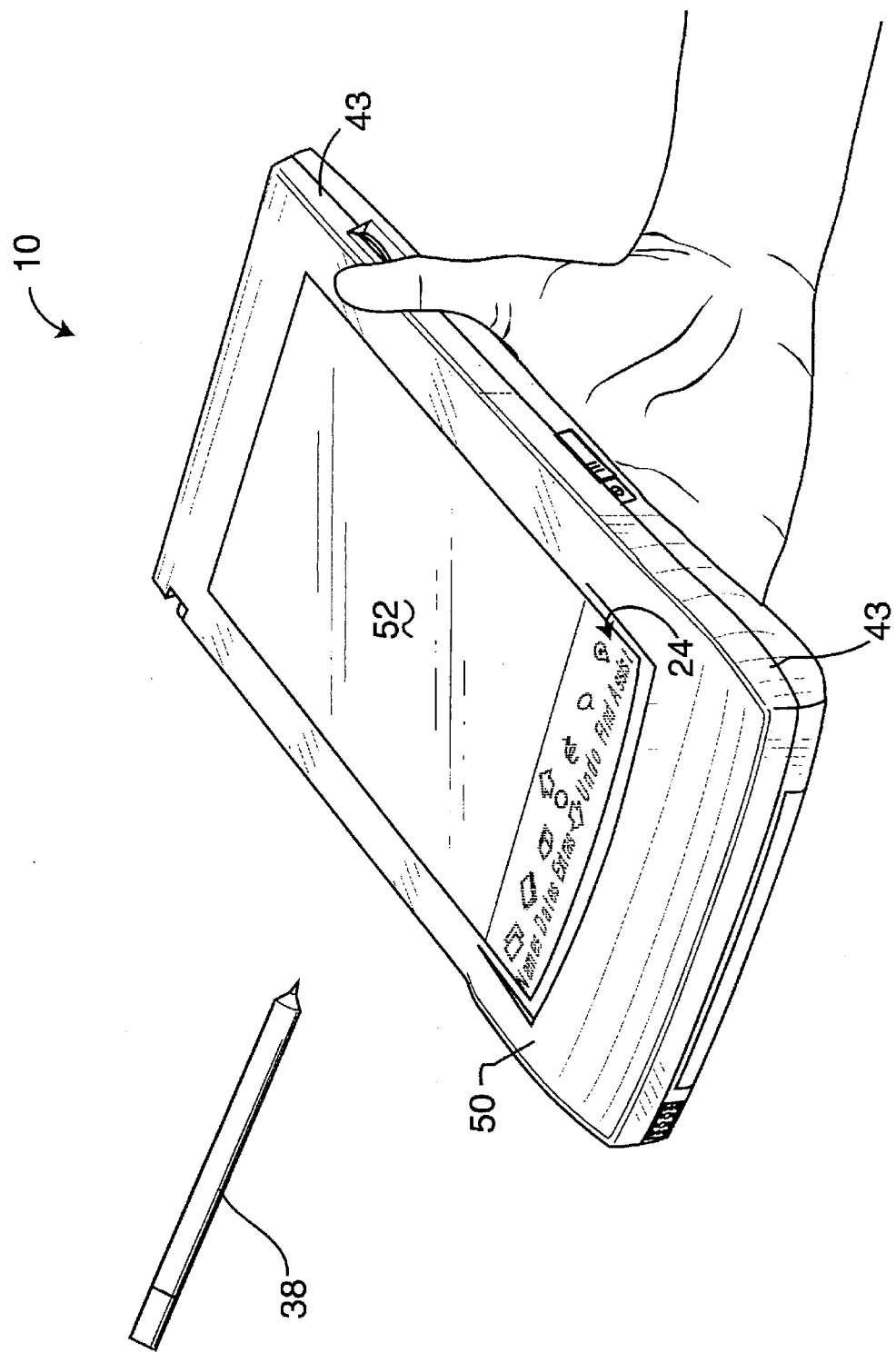
FIG. 3 is a perspective view of the pen-based computer system held in the hand of a user.

FIG. 3 is a perspective view of pen-based computer system 10 in enclosure 50 used as a portable pen-based computer held, in this case, in the right hand of a left-handed user. Housing 50, as shown, is sized to fit in the palm of a human hand. Rounded edges 43 extend peripherally about housing 50 and provide a convenient grip for a user. Rounded edges 43 also extend above display assembly 20 to further improve grip during operation and to protect viewing screen 52 against impact and scratches. The configuration of housing 50 permits a secure grip for most operators whether right handed, left handed or even operators with impaired grasp.

Figure 4:
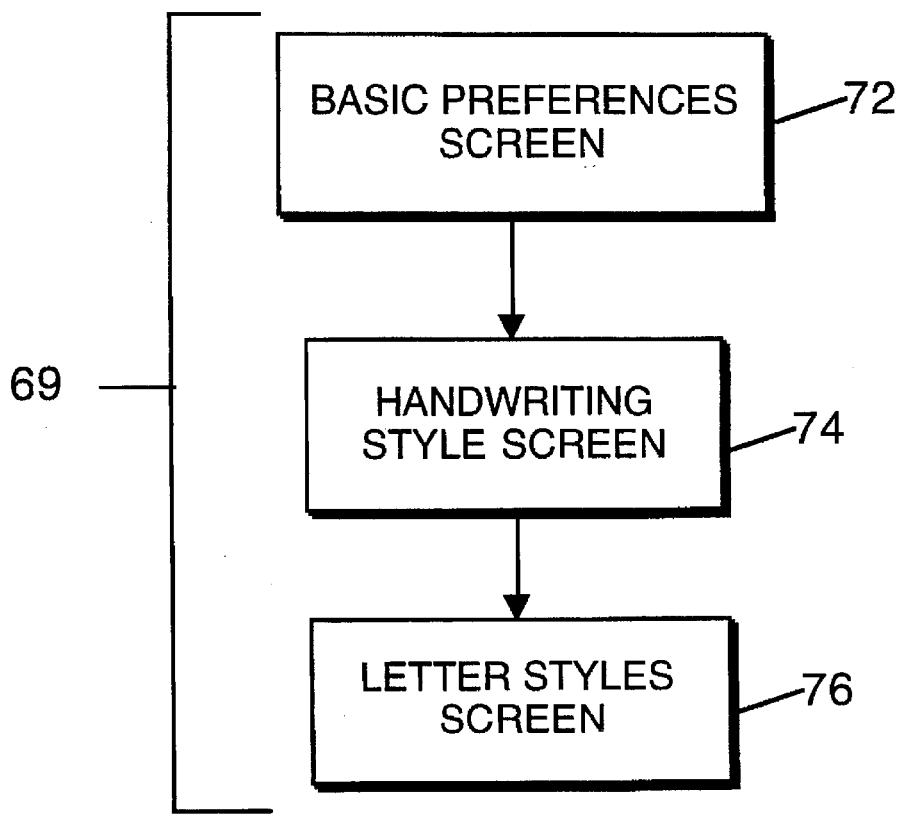
FIG. 4 is a flow chart illustrating a likely sequence of handwriting preference screens.

Referring now to FIG. 4, a chart depicts a typical sequence of handwriting preferences screens 69. Preference screens 69 are presented on viewing screen 52, for example, when selected by a user answering an appropriate prompt. Initially, a basic preferences screen 72 is displayed on viewing screen 52. The basic preferences screen presents a number of options to the user and is described in greater detail with reference to FIG. 5. The handwriting style screen 74 is typically selected from the basic preferences screen 72. The handwriting style screen is described with reference to FIG. 6a. From the handwriting style screen 74, a letter styles screen is typically selected. Letter styles screen is described with reference to FIG. 8. The user may then exit the handwriting preferences screens. The user can also select screens 69 in an order different from that described above. For example, a user can select the letter styles screen 76 from the basic preferences screen 72, go back to the basic preferences screen 72, and select the handwriting style screen. Other preferences listed in basic preferences screen 72 can also be selected before, after, or in between the selection of screens 72, 74, and 76.

In FIG. 5, basic preferences screen 72 is presented and provides preference options 71 (possible user interactive events) in menu form. For the purposes of the present invention, handwriting style preference option 73, described with reference to FIGS. 6a, 6b, and 7, and letter style preference option 75, described with reference to FIG. 8, are particularly relevant. Various other options 71 are other desired user interactive events and are more fully described in U.S. Pat. No. 5,434,929, which is incorporated herein by reference. More specifically, the handwriting training preference option is described in detail in co-pending U.S. patent application Ser. No. 08/282,199, filed Jul. 29, 1994, by Beernink et al., filed on an even day herewith, entitled, "Method and Apparatus for Training a Recognizer," assigned to the assignee of the present invention and incorporated herein by reference.

Software employed by computer system 10 and various user interactive event functions, such as preference screen operation, user interface and handwriting recognition are described more particularly in the following publications which are incorporated herein by reference: 1) *The Newton-Script Programming Language,* Copyright 1993, 1994 by Apple Computer, Inc.; and 2) *Newton Programmer's Guide,* Chapter 8, Copyright 1993, 1994 by Apple Computer, Inc.

Figure 6A:
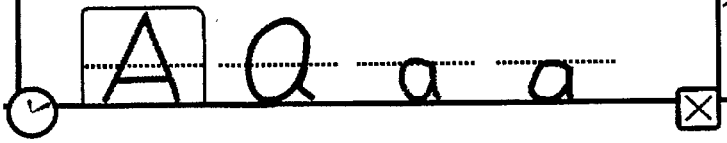
FIG. 6a illustrates a preferences handwriting style screen configured for a primary user.

In FIG. 6a, the preferences handwriting style screen 74 is shown. This screen is typically displayed by selecting option 73 from basic preferences screen 72. The user can also scroll screen 74 into view from a different preferences screen by selecting scroll buttons 66a and 66b. Preferences handwriting style screen 74 presents handwriting preferences data and a user identity query to the user in the form of preference options. Desired handwriting style preference options are selected by applying stylus 38 to screen 52. Preferences which the user may adjust or select include handwriting style, word spacing, recognition speed, and handwriting transformation speed. Options 77 and 78 can be directly selected, while options 79, 81, and 83 can be selected by "dragging" slider bars 85a–c across viewing screen 20 (i.e., holding stylus 38 to the slider bar image and moving the stylus across the screen). The options 79, 81, and 83 can thus be selectively modified to a desired level.

Handwriting style option 77 allows the user to select cursive or printed handwriting styles. A user's preferred handwriting style can be selected by touching one of the selection boxes (sometimes known as a "radio button") with a stylus. Options include cursive only, primed only, and mixed cursive and printing. By providing this information to the CPU 12, the user allows the recognition software to recognize handwriting more accurately. For example, if the recognizer knows that the handwriting will only be cursive style, it can check for cursive type letters and characteristics of cursive handwriting to the exclusion of other handwriting styles.

Another preference is word spacing. By adjusting the slider control 85a of option 79 with a pointing device, a user can inform the recognizer that the words of his or her handwriting are spaced apart widely, an intermediate mount, or closely. This information is used by the recognizer to look for wide spaces between words or to look for close spaces between words; the close spacing can cause more difficulty in distinguishing separate words. The recognition speed preference option 81 can be selected by adjusting slider bar 85b to cause the recognizer to recognize and output a guess more quickly or more slowly. Users who write neatly or write words which the recognizer recognizes easily may want to choose fast recognition, while users who write in a style which tends to cause misrecognition may want slower recognition for more accuracy. The handwriting transformation speed preference option 83 can be selected by slider bar 85c to instruct the recognizer to wait a short time before recognizing a written word, or to wait a longer time before attempting to recognize a word. In the described embodiment, the length of waiting time can be adjusted from a minimum of about one-tenth of a second to a maximum of about one second, with a default waiting time of about ¾ second. Guest user box 78 can be selected by the user to toggle guest and primary user modes (described below). The modified handwriting preferences options data is automatically saved by computer 10 in RAM 16 and BBRAM 17 as handwriting preferences data. The implementations of radio buttons and slider bars are well known to those skilled in the art.

Figure 6B:
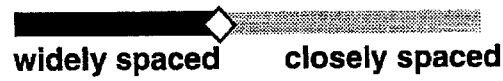
FIG. 6b is an alternate embodiment of a handwriting style screen of the present invention.
Figure 6B:
Figure 6B:
Figure 6B:
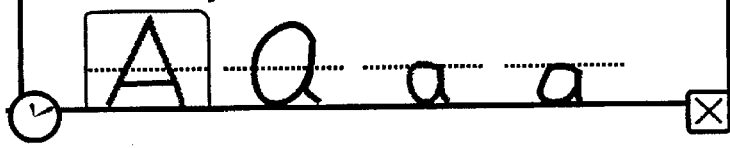

With reference to FIGS. 6a and 6b, handwriting style screen 74 presents the text 87 "Configure for Guest User" which appears near the bottom of handwriting style screen 74. A graphical icon 78 is shown adjacent text 87 and represents guest toggle option 80. Stylus 38 can be engaged with viewing screen 52 upon icon 78 and thereby actuate (select) guest toggle 80. When actuated, guest toggle 80 changes computer system 10 from guest mode to primary user mode or vice-versa. A set of preferences can thus be loaded or saved for the primary (non-guest) user, and a different set of preferences can be loaded for a different user, called a guest user. As described below, the different user modes also allow recognition of handwriting tailored to the specific user (guest or primary user) to take place. In an alternate embodiment, a number of additional guest modes can be provided, one of which can be selected. A menu or similar selection device can be used to select one of the guest modes. This allows more than one guest user to each have his or her own set of preferences and user-specific data associated with his or her style of handwriting.

While computer system 10 operates in guest user mode (see FIG. 6b) and viewing screen 52 presents preferences handwriting style screen 74, a check mark 90 is displayed over icon 78. As shown in FIGS. 6a and 6b, the top portion of preferences letter styles screen 76 appears at the bottom of handwriting style screen 74. Stylus 38 can select an appropriate portion of preferences letter styles screen 76, or a key on keypad 24', to scroll screen 76 for full viewing.

Figure 7:
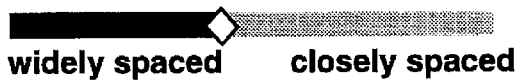
FIG. 7 illustrates a handwriting style preferences screen configured for a guest user.
Figure 7:
Figure 7:
Figure 7:
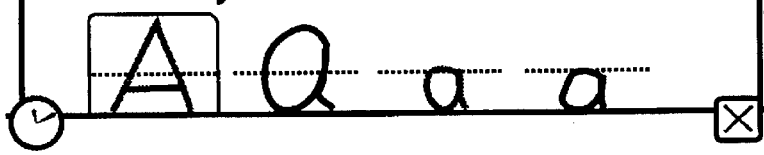
Figure 8:
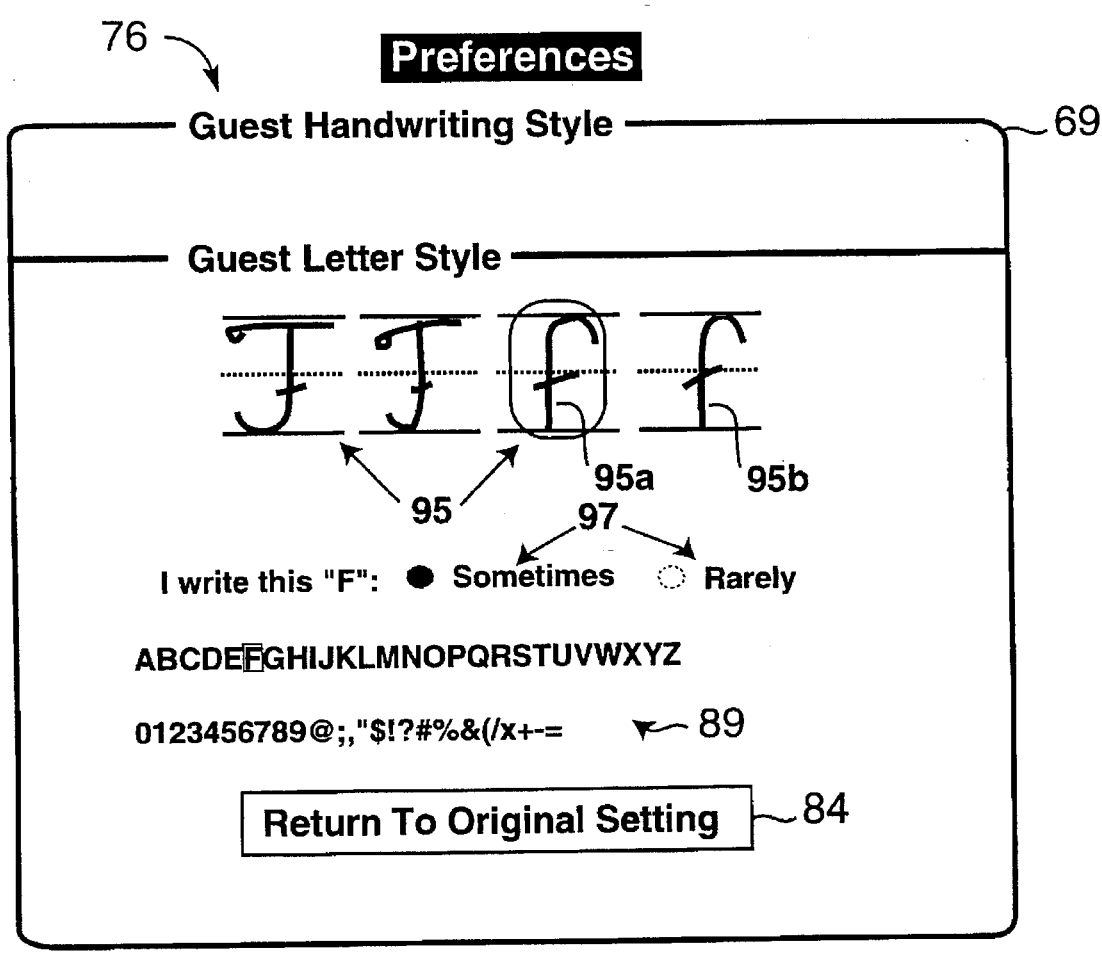
FIG. 8 illustrates a letter style preferences screen.

FIG. 7 shows an alternate embodiment of handwriting preferences screen 74 in which two preferences have been added to the options selectable by the user. An enable learning toggle 91 allows the user to selectively enable or disable learning mode. In learning mode, the computer system automatically updates adaptive learning data associated with the user to better recognize handwriting input by the user; this is described with reference to FIG. 12. A save handwriting preferences toggle 93, when actuated, allows the current, modified set of preferences (handwriting preferences data) to be saved in RAM 16 and BBRAM 17 for the current user.

Referring now to FIG. 8, viewing screen 52 displays letter style screen 76. Adaptive learning data assists computer system 10 in identifying letter style configurations characteristic of a user, i.e., how a user writes a character and the order of entering ink strokes which comprise a character. The user can apply stylus 38 to modify adaptive learning data that is presented on letter style screen 76. A user selects one of the characters 89 of which he wishes to modify the letter style. The selected character 89 is displayed in inverse (white character on black background) or a similar indicator for the selected character is displayed. CPU 12 then displays style letters 95 for the selected character 89. For each displayed style letter 95, the user can select whether he or she writes that letter style either "sometimes" or "rarely" by actuating one of toggles 97. Letter styles which are chosen as "rarely" are preferably displayed in a grey shade or with a similar characteristic to indicate that they are not preferred by the user. In the described embodiment, the shape of style letters 95 is presented in letter style screen 76, as well as the order of inputting the ink strokes which comprise the style letters. The order of strokes is displayed when the user selects a style letter 95. The CPU preferably displays a real-time animation of the selected style letter being drawn, similar to the way a user would write an ink stroke. For example, style letter 95a is erased and drawn starting from the bottom of the stem of the "f" when selected, and style letter 95b is erased and drawn starting from the top of the stem of the "f" when selected. Thus, a user can specify that he writes an "f" character starting with the top of the stem of the "f" by selecting the "sometimes" toggle 97 for style letter 95a and selecting the "rarely" toggle for style letter 95b. In an alternate embodiment, additional toggles 97 can be provided to allow the user to select preferred letter styles to a finer degree.

Computer system 10 automatically saves adaptive learning data associated with the style letters selected and modified by the user. In an alternate embodiment, as shown in FIG. 7, the adaptive learning data is saved when stylus 38 actuates the save handwriting preferences toggle 93. Letter style screen 76 provides an original settings toggle 84, which displays the text "Return to Original Settings." Original settings toggle 84 purges handwriting preferences data and learned handwriting recognition data from RAM 16 when selected by stylus 38. Default data read from ROM 14 replaces the purged data in RAM 16 when toggle 84 is actuated (see FIG. 11).

Figure 9:
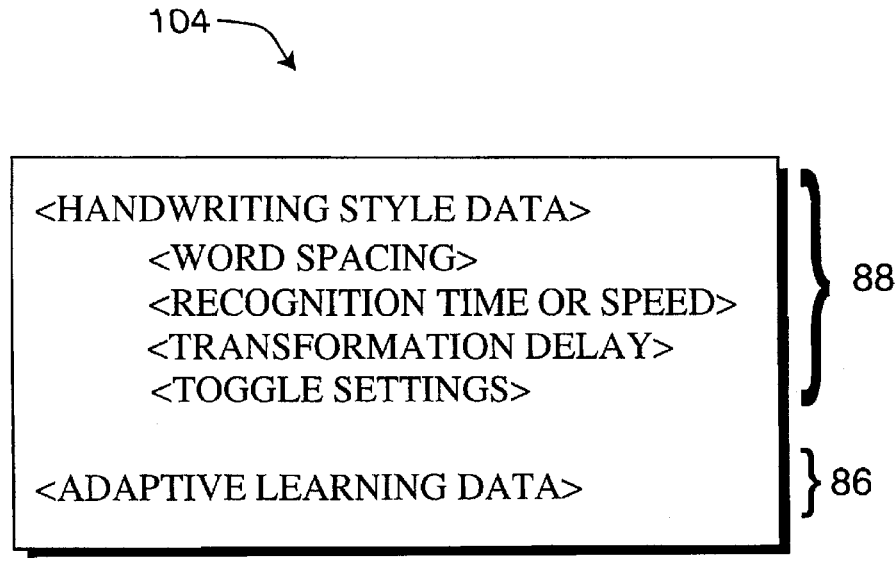
FIG. 9 is a diagrammatic illustration showing a typical data format employed by the present invention.

Referring to FIG. 9, a general database format used by pen-based computer system 10 for handwriting recognition is shown and includes handwriting data 104. Handwriting data 104 more particularly includes adaptive learning data 86 and handwriting style data 88 which are formatted for storage in separate memory slots. Adaptive learning data is produced and used by the recognizer as the user inputs handwriting to more quickly and accurately recognize a particular user's handwriting, and can be modified by the user. The adaptive learning data includes the letter styles selected in screen 76. Handwriting style data 88 includes options saved from the handwriting style options selected in screen 74, which, more particularly, includes data representative of learning, recognition of time or speed, transformation delay, space between words, and toggle settings, such as the setting for guest mode toggle 80. Herein, "handwriting preferences data" includes handwriting style data 88 as well as adaptive learning data 86 associated with the letter styles selected in preferences screen 76.

Figure 10:
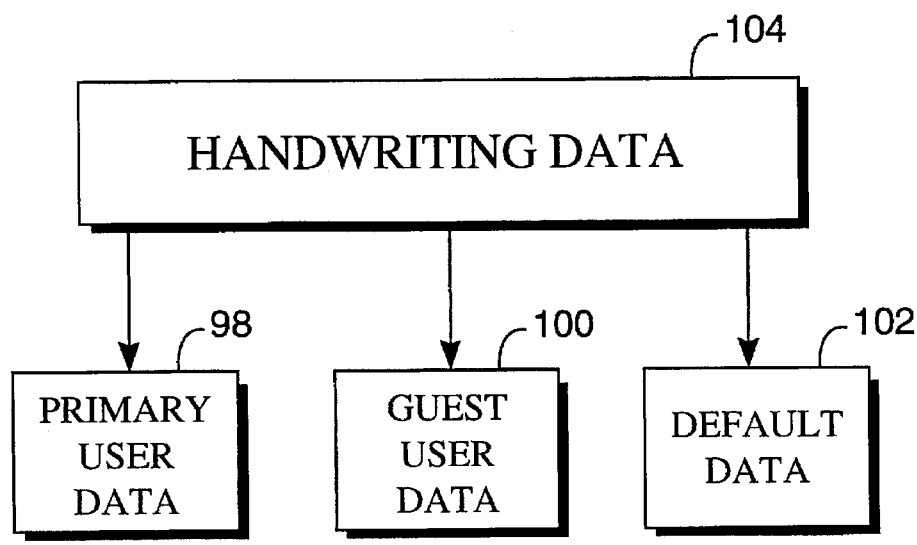
FIG. 10 is a diagrammatic illustration showing user-specific data employed by the present invention.

Referring to FIG. 10, handwriting data 104 is categorized with reference to the user of computer system 10, and includes primary user data 98, guest user data 100, and default data 102. Primary user data 98 includes the handwriting style data and adaptive learning data saved for the primary user of pen-based computer 10. Guest user data 100 includes the handwriting style data and adaptive learning data stored for the guest user. Default data 102 includes the original settings for handwriting and letter style preferences, and is stored in ROM 14.

Figure 11:
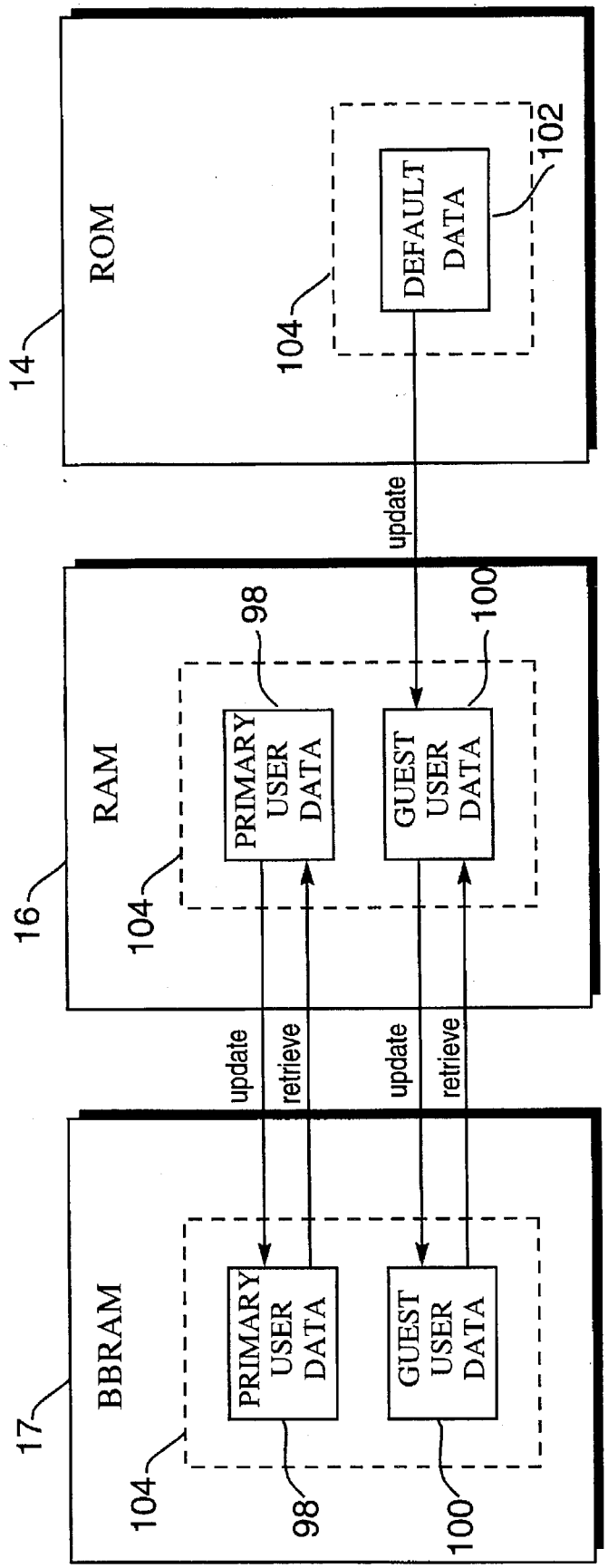
FIG. 11 is a diagrammatic representation of of data flow between memories.

Referring to FIG. 11, a process of alternate update and retrieval of handwriting data 104 is shown. It can be appreciated that primary user data 98 is stored in RAM 16 and a duplicate of primary user data 98 is stored in BBRAM 17 for backup purposes. The data stored in ROM 14 includes default data 102 and is formatted as generally shown in FIG. 9. Default data 102 is read from ROM 14 and is temporarily stored in RAM 16 and BBRAM 17 when a guest user first operates pen-based computer system 10. Modifications by a guest user to default data 102 are stored in RAM 16 and BBRAM 17 as guest user data 100 until purged. Default data 102 read from RAM 16 is used, for example, when the guest mode toggle 80 or when the return to original settings toggle 84 is actuated. Additionally, when computer system 10 is first used by the primary user in primary user mode, default data 102 is retrieved and stored in RAM 16 for the primary user until the default data is modified and saved in BBRAM 17 as primary user data 98.

In the alternate embodiment including more than one guest user mode, a section in RAM 16 and BBRAM 17 can be provided for each mode implemented on the pen-based computer system 10. The information related to the additional guest modes can be retrieved and purged similarly to the guest mode described above. Alternatively, additional primary user modes can be provided which function similarly to the primary user mode described above.

Figure 12:
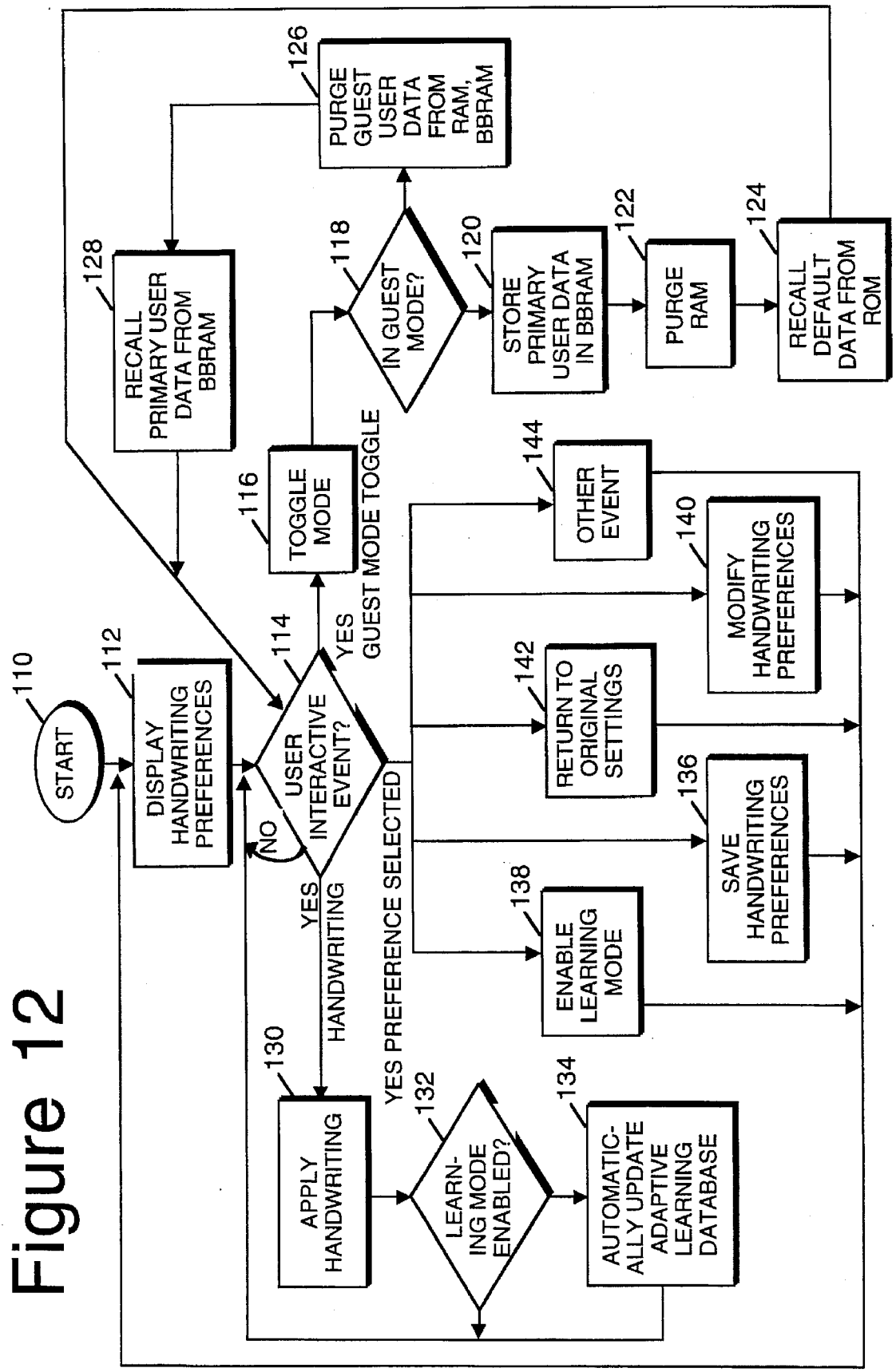
FIG. 12 is a flowchart depicting user interactive events which arise from the preferences screens depicted in FIG. 5 through FIG. 8.

Referring now to FIG. 12, a flow chart illustrates user-interactive events according to the disclosed embodiments of the present invention. The process begins at 110, and, in step 112, a desired preference screen 69 is displayed as selected by the user, such as shown in FIGS. 5, 6a, 6b, 7, or 8. In step 114, the CPU checks for a user-interactive event that is initiated when the user selects a toggle or button with stylus 38. User-interactive events include, for example, saving handwriting preferences, enabling learning mode, modifying handwriting preferences, returning to original settings, guest mode selection, and other events 71 shown in FIG. 5 or options of FIGS. 6a, 6b, 7, or 8, as well as the event of exiting the displayed preferences screen.

If the interactive event detected in step 114 is a guest mode toggle activation, then step 116 is initiated, in which the computer system 10 toggles the mode, either from guest mode to primary user mode, or from primary user mode to guest mode. In step 118, the CPU checks if the computer system is in guest mode. If so, then step 120 is implemented, in which the primary user data 98 is stored in BBRAM 17. In step 122, RAM 16 is purged, and, in step 124, default data is retrieved from ROM 14 to be used as guest mode data. The process then returns to step 114, where the CPU checks for another user-interactive event.

If the CPU detects that the computer system is not in guest mode in step 118, then step 126 is implemented, in which the guest user data is purged from RAM 16 and BBRAM 17. In step 128, the CPU retrieves primary user data 98 from BBRAM 17. Then process then returns to step 114 to wait for another user-interactive event.

If the CPU detects handwriting made by the user, such as in a note area 54 or other entry area on viewing screen 52, then step 130 is implemented, in which the handwriting is applied by the user and displayed on screen 52. In step 132, the CPU checks if adaptive learning mode is enabled. If not, the process returns to step 114. If adaptive learning mode is enabled, the process continues to step 134, in which the adaptive learning database is automatically updated with the letter styles and other learning data associated with the electronic ink corresponding to strokes input by the user. The method of updating a database with adaptive learning data (or "training data") varies depending on the implementation of the recognizer used. In the described embodiment, the recognizer provides adaptive learning data when ink is recognized, and that adaptive training data is passed back to the recognizer after it is confirmed that the learning data corresponds to the correct word or letters. A suitable method of updating a training database with adaptive learning data is described in the abovementioned co-pending patent application entitled, "Method and Apparatus for Training a Recognizer," Ser. No. 08/282,199, filed Jul. 29, 1994, filed on an even day herewith. The recognizer can use this adaptive learning data to more accurately and quickly recognize a particular user's handwriting. The process then returns to step 114.

If the interactive event detected in step 114 is a preference option displayed in one of the preferences screens, then one or more of steps 136–144 is implemented. In step 136, CPU 12 automatically saves handwriting style data 88 in RAM 16, and stores a backup of data 88 in BBRAM 17 when data 88 is modified by a user. Alternatively, as in the embodiment of FIG. 7, the user can initiate the saving of data 88 in step 136 when stylus 38 selects the save handwriting preferences toggle 93 which is presented on the preferences handwriting style screen 74. Accordingly, handwriting style data 88 is stored in RAM 16 and BBRAM 17 after modification for retrieval during handwriting recognition by the computer system 10.

In step 138, as shown in the alternate embodiment of FIG. 7, the user selects the enable learning mode toggle presented in preferences handwriting style screen 74 with stylus 38 to selectively enable or disable (activate or deactivate) adaptive learning mode. With learning mode enabled, the computer system automatically updates the adaptive learning data 86 associated with the user to better recognize handwriting applied to the input tablet by the user, as described above. With learning mode disabled, the adaptive learning data 86 employed by computer system 10 is not updated. In the preferred embodiment, however, adaptive learning data 86 is continually employed and updated by computer system 10.

In step 140, a user can modify the handwriting preferences. This can include the selection of a preferences option shown in FIG. 5, for example. This step can also include modifying such handwriting style options 77, 79, 81, 83, and 80 as shown in handwriting style screen 74. Additionally, this step can include modifying the letter style preferences and other options presented in letter style screen 76.

In step 142, the user selects the return to original settings toggle 84 which purges data from RAM 16 and BBRAM 17 and replaces purged data with default data 102 as discussed with respect to FIG. 11. Any other event, such as the selection of a preference listed on basic preference screen 72 or a different screen, can be implemented in step 144.

After a step of steps 136–144 has been implemented, one or more other steps 136–144 can also be implemented depending on the preferences screen displayed or the desire of the user. In general, the process returns back to step 112, where a preferences screen is displayed. If the user decides to exit the preferences screen in step 114, the preference screen is erased and either a new preference screen is displayed or a different screen of pen-based computer 10 is displayed.

Figure 13:
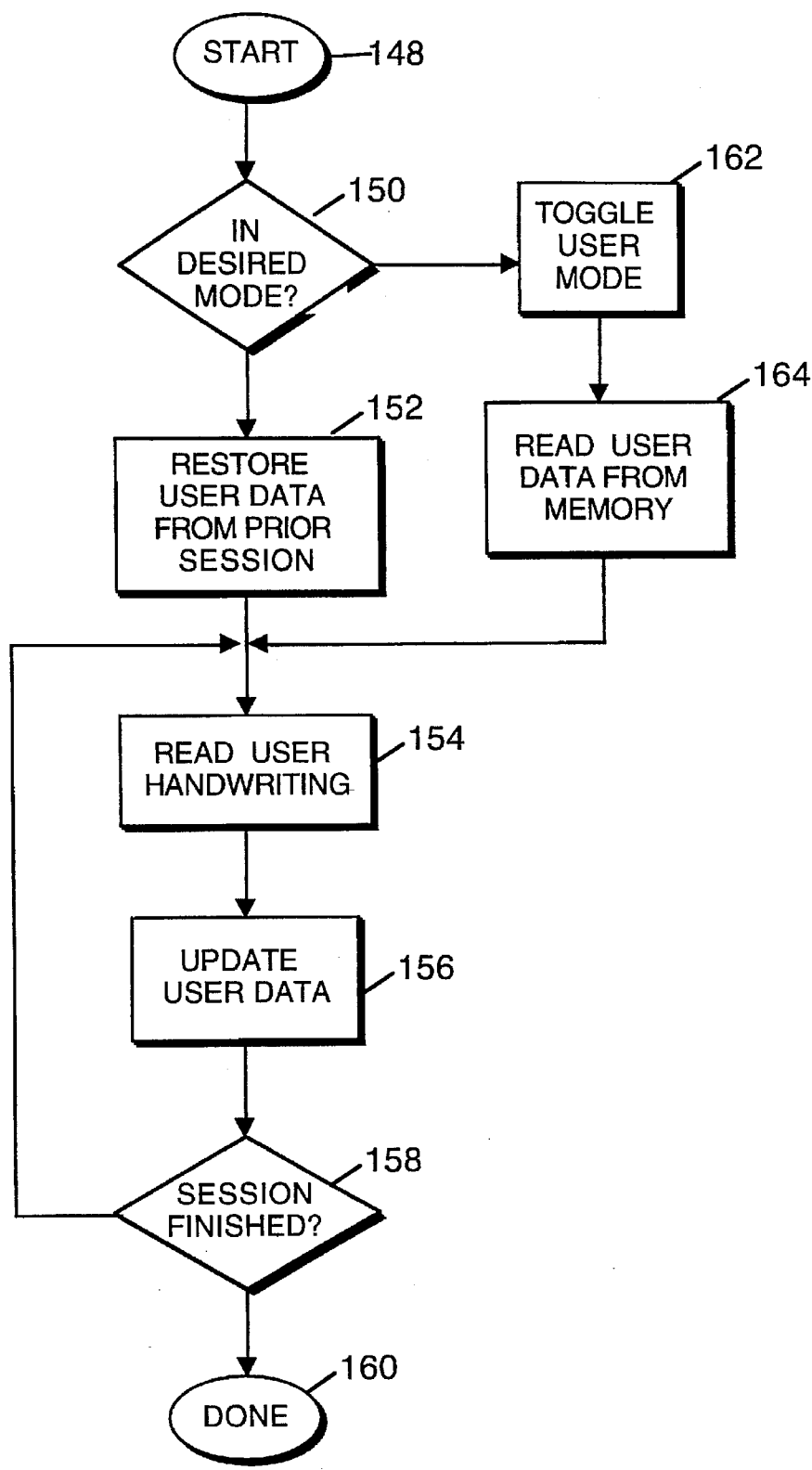
FIG. 13 is a flowchart illustrating the sequence of steps taken by the present invention in response to a user.

Referring now to FIG. 13, a flow chart depicting operation of computer system 10 by a user is shown. The process of FIG. 13 can be used both for a primary user or for a guest user. The process begins at 148 where computer system 10 is powered up, and, in step 150, the CPU checks if computer system 10 is in the desired mode, i.e. either guest mode or primary user mode. If check-mark 90 is present on the guest mode toggle 80 (i.e., a guest mode flag is set), computer system 10 is in guest mode, and is otherwise in primary user mode. When the computer system is in the desired mode, step 152 is implemented, in which the appropriate user data is restored into RAM 16 from data stored in BBRAM 17 from a prior session. For example, if a guest user is using computer system 10, the guest user data 100 is loaded from BBRAM 17 into RAM 16. If a primary user is using the computer, primary user data 98 is loaded into RAM 16. Step 154 is then implemented, in which images on screen 52 are scrolled and computer system 10 accepts handwriting from the user in note areas 54. The handwriting is recognized using the appropriate user data for handwriting recognition, i.e. guest user data 100 for a guest user and primary user data 98 for the primary user. The handwritten input is associated with a note number and is dated and saved by the user selecting an appropriate button 64 on keypad 24. The user data 100 or 98 is automatically updated and saved in RAM 16 in step 156 according to an adaptive learning algorithm provided by a suitable word recognizer, or may be updated and saved via the preferences screen 72. In step 158, the CPU checks if the session is finished by checking if the user has selected a button, such as on keyboard 24', or entered an appropriate gesture to quit. If the session is not finished, the process returns to step 154 to accept and recognize more user handwriting. If the session is finished, the process is complete as indicated at 160.

If the computer system is activated in a user mode not desired by the user in step 150, then the user locates and toggles guest user toggle 80 in step 162 to exit the current user mode and enter the other user mode. Computer system 10 purges current user data 98 or 100 from RAM 16 and stores the user data in BBRAM 17 for future use by the user. Alteratively, if the user is a primary user and guest mode is currently selected, the current guest user data 100 in RAM 16 can be completely purged from both RAM 16 and BBRAM 17. In step 154, user data is restored from storage to RAM 16. If a guest user is currently operating the computer system, default user data 102 is read into RAM 16 from ROM 14 to provide the guest user with a standard set of handwriting preferences. If a primary user is currently operating the computer system, primary user data 98 is read from BBRAM 17. In step 156, desired user handwriting preferences are modified, displayed and saved as user data 98 or 100 in RAM 16. Handwriting is applied to note areas 54 and recognized by computer system 10 which now employs the user data 98 or 100 for handwriting recognition, as described above.

As disclosed, the inventive concept provides a computerized notepad which is user configured and responds according to the identity of the user. While the present invention is described in terms of a preferred embodiment, it can be appreciated by those skilled in the art that certain changes and modifications can be made without departing from the scope of the invention. The scope of the appended claims are, therefore, to be understood as including such likely changes and modifications.

What is claimed is:

1. A method of recognizing the handwriting of one of several users of a pen-based computer comprising the steps of:

providing a pen-based computer having memory and a dual-function display assembly capable of receiving input and producing output;

providing user-specific handwriting data for a primary user and at least one guest user, said user-specific handwriting data including handwriting style data generically applicable to a corresponding user's handwriting, the handwriting style data including at least one handwriting style preference selected from the group consisting of printing, cursive, mixed printing and cursive, and at least one from the group consisting of recognition speed and word separation;

storing said user-specific handwriting data for said primary user and said at least one guest user in said memory;

displaying a handwriting preferences option on said dual-function display assembly;

directing a pointing device to said preferences option to communicate user interactive events to said pen-based computer, said user interactive events including user identification;

identifying the user of the pen-based computer; and interpreting the handwriting of said user using said user-specific handwriting data appropriate for said user.

2. A method as recited in claim 1 wherein said preferences option identifies the user, and said method further comprises associating user-specific data with said user, said data including adaptive learning data and handwriting preferences data.

3. A method as recited in claim 2 wherein said handwriting preferences option is displayed on a handwriting preferences screen, said handwriting preferences data is presented on said handwriting preferences screen and said user interactive events include modifying said handwriting preferences data by directing said pointing device to said handwriting preferences screen.

4. A method as recited in claim 3 wherein said memory includes RAM backed up by BBRAM, said method further comprising employing said pointing device to save said modified handwriting preferences data in said memory by actuating a "save handwriting preferences" toggle provided on said handwriting preferences screen.

5. A method as recited in claim 2 wherein said user interactive events include moving said pointing device to actuate a "learning mode" toggle provided on said display assembly and to selectively enable or disable said pen-based computer from automatically updating said adaptive learning data.

6. A method as recited in claim 3 wherein said user interactive events include moving said pointing device to actuate a "return to original settings" toggle presented on said preferences screen and to purge said writing preferences data from said memory, said purged writing preferences data being replaced with default data read from a ROM.

7. A method as recited in claim 2 wherein said user interactive events includes activating a "guest user" toggle provided on said display assembly with said pointing device and identifying the user as either a primary user or a guest user to permit selective operation of said pen-based computer in a primary user mode or a guest user mode, respectively.

8. A method as recited in claim 7 wherein said user is identified as a primary user, said data is primary user data, and said primary user data is updated and saved in said RAM and backed up in said BBRAM when said handwriting is recognized.

9. A method as recited in claim 7 wherein said user is identified as a guest user, said data is guest user data, said handwriting is input to said pen-based computer by said guest user, said guest user data is updated, and said updated guest user data is purged from said RAM when the guest mode toggle is activated to indicate operation by the primary user.

10. A method as recited in claim 8 wherein said adaptive learning data is automatically updated by said pen-based computer and said handwriting preferences data is selectively updated when said pointing device is directed at said display assembly to modify said handwriting preferences data.

11. A method as recited in claim 9 wherein said adaptive learning data is automatically updated by said pen-based computer and said handwriting preferences data is selectively updated by said user when said pointing device is directed at said display assembly to modify said handwriting preferences.

12. A method of identifying a user of a pen-based computer capable of handwriting recognition, said method comprising the steps of:

providing a computer system capable of storing data in memory, a stylus, and a dual-function display assembly including both a liquid crystal display linked to said computer system and an input tablet capable of determining the position of said stylus overlying said liquid crystal display;

displaying an image on said liquid crystal display to query the identity of said user;

determining said identity of said user with said computer system using the position of said stylus with respect to said input tablet;

retrieving data from a database using said computer system, said database having data for a primary user and at least one guest user, said data including handwriting style data generically applicable to said user's handwriting, the handwriting style data including at least one handwriting style preference selected from the group consisting of printing, cursive, mixed printing and cursive, and at least one from the group consisting of recognition speed and word separation; and utilizing said data to facilitate recognition of handwriting applied to said input tablet by said user with said stylus.

13. A computer readable medium containing program instructions for recognizing the handwriting for one of several users of a pen-based computer including a dual-function display assembly and a memory, said program instructions comprising instructions for:

providing user-specific handwriting data for a primary user and at least one guest user, said user-specific handwriting data including handwriting style data generically applicable to a corresponding user's handwriting, the handwriting style data including at least one handwriting style preference selected from the group consisting of printing, cursive, mixed printing and cursive, and at least one from the group consisting of recognition speed and word separation;

storing said user-specific handwriting data for said primary user and said at least one guest user in said memory;

displaying a handwriting preferences option on said dual-function display assembly;

identifying the user of the pen-based computer; and interpreting the handwriting of said user using said user-specific handwriting data appropriate for said user.

14. A method as recited in claim 12 wherein:

said image is a handwriting preferences screen and said data is stored in RAM during operation of said computer system;

said data includes adaptive learning data which is automatically updated during operation of said computer system, and handwriting preferences data, which is displayed upon and selectively updated via said handwriting preferences screen, wherein said handwriting preferences data includes handwriting style, letter style, recognition time or speed, transformation delay, toggle settings, user identity and space between words; and said handwriting preferences screen includes an "adaptive learning" toggle which is actuated by application of said stylus to said preferences screen to selectively enable or disable automatic update of said adaptive learning data in BBRAM.

15. A method as recited in claim 14, wherein said handwriting preferences screen includes a "save preferences" toggle which is actuated by application of said stylus to said input tablet to save said handwriting preferences data in BBRAM.

16. A method as recited in claim 14 wherein said handwriting preferences screen includes a "guest user" toggle which is actuated by application of said stylus to said input tablet to selectively indicate user identity as a primary user or a guest user to cause said computer system to operate in primary user mode by associating primary user data with said primary user, or in guest user mode by associating guest user data with said guest user, respectively.

17. A method as recited in claim 16 wherein said computer operates in guest user mode, said guest user toggle is actuated from "guest user" to "primary user" setting, said guest user data is purged from RAM and replaced by primary user data stored in BBRAM to facilitate recognition of handwriting applied to said input tablet by a primary user.

18. A method as recited in claim 16 wherein said computer system operates in primary user mode, said guest user toggle is actuated from "primary user" to "guest user" setting, primary user data stored in RAM is purged from RAM and saved in BBRAM, default data stored in ROM is read and stored in RAM to facilitate handwriting recognition of handwriting applied to said input tablet by a guest user.

19. A method as recited in claim 16 wherein said preferences screen includes a "return to original settings" toggle which is actuated by application of said stylus to said display to purge handwriting preferences data stored in RAM and replace said purged data by default data from ROM.

20. A hand-held pen-based computer capable of identifying a user to facilitate handwriting recognition comprising:

a housing;

a dual-function display mounted in said housing, said dual-function display being pressure sensitive;

an audio system enclosed within said housing for communicating with said user;

a pointing device, said pointing device being formed with a hand grip and a pointed end for application against said display; and a computer system enclosed within said housing and connected to communicate with said dual-function display and said audio system, said computer system being adapted with appropriate software, memory and processing capacity to store handwriting data specific to a primary user and at least one guest user, to identify the user and to recognize handwriting applied to said dual-function display by said pointing device using said handwriting data specific to said user, wherein said handwriting data specific to said user includes handwriting style data generically applicable to said user's handwriting, the handwriting style data including at least one handwriting style preference selected from the group consisting of printing, cursive, mixed printing and cursive, and at least one from the group consisting of recognition speed and word separation.

21. A device as recited in claim 20 wherein:

said computer system associates data with said user, said data being user-specific to facilitate handwriting recognition:

wherein said data includes handwriting preferences data includes word spacing, word recognition speed, handwriting style, input transformation time, space between letters, toggle settings, user identity and letter style, and said handwriting preferences data is selectively updated by the application of said pointing device against said dual-function display by said user and adaptive learning data which is automatically updated by said computer system during operation.

22. A device as recited in claim 21 wherein said dual-function display includes a liquid crystal display and an input tablet, and wherein a preference screen is presented on said dual-function display, said preference screen including the text "configure for guest user", said pointing device being applied against said preferences screen by the user to identify the user as a primary user or as a guest user.

23. A device as recited in claim 22 wherein said data is guest user data when said user is identified as a guest user and said data is primary user data when said user is identified as a primary user.

24. A device as recited in claim 23 wherein said housing includes a recessed face for protecting said display which is mounted on said recessed face, said housing being formed with rounded edges which surround the periphery of said housing to provide an effective hand grip for multiple users, said housing including a plurality of apertures to permit audio communication between said sound system and the user.

25. A computer readable medium as recited in claim 13, wherein said program instructions further comprise instructions for associating user-specific handwriting data with said user, wherein said user-specific handwriting data includes adaptive learning data and handwriting preferences data.

26. A device as recited in claim 21 wherein said data is associated with a guest user and a guest user toggle displayed on said dual-function display is actuated to identify the primary user, said guest user data is purged from RAM and said primary user data replaces said purged guest user data in RAM.

27. A device as recited in claim 21 wherein said data is associated with a primary user and a guest user toggle displayed on said dual-function display is actuated to identify the guest user, said primary user data is purged from RAM and saved in BBRAM, said guest user data is default data and is read from ROM into RAM.

28. A pen-based computer system comprising:

a digital processor;

read/write memory coupled to said digital processor;

a display screen coupled to said digital processor;

a pointing device coupled to said digital processor, said pointing device being operative to enter strokes which are interpreted as electronic ink by said computer system;

a recognizer implemented by said digital processor for recognizing ink created by a user with said pointing device; and means for identifying said user and associating user-specific handwriting data stored on said pen-based computer system with said user such that said recognizer is able to recognize said ink input by said user with greater accuracy using said user-specific handwriting data, said user-specific handwriting data including handwriting style data generically applicable to said user's handwriting, the handwriting style data including at least one handwriting style preference selected from the group consisting of printing, cursive, mixed printing and cursive, and at least one from the group consisting of recognition speed and word separation.

29. A pen-based computer system as recited in claim 28 wherein said user is identified as either a primary user of said pen-based computer system or as a guest user.

30. A pen-based computer system as recited in claim 29 further comprising an input tablet coupled to said display screen and responsive to said pointing device to enter said ink into said pen-based computer system.

31. A pen-based computer system as recited in claim 30 further comprising means for receiving handwriting style preferences from said user, wherein said handwriting style preferences are included in said user-specific data.

32. A pen-based computer system as recited in claim 31 further comprising means for receiving letter style preferences from said user, wherein said letter style preferences are included in said user-specific data.

33. A computer readable medium as recited in claim 25, wherein said program instructions further comprise instructions for selectively enabling or disabling said pen-based computer from automatically updating said adaptive learning data.

34. A computer readable medium as recited in claim 25, wherein said program instructions include instructions for:

displaying a handwriting preferences option on a handwriting preferences screen;

displaying handwriting preferences data on said handwriting preferences screen; and updating said handwriting preferences data in response to user inputs to said handwriting preferences screen.

35. A computer readable medium as recited in claim 34 wherein said program instructions further comprise instructions for saving said modified handwriting preferences data in said memory by actuating a toggle provided on said handwriting preferences screen.

36. A computer readable medium as recited in claim 35 wherein said program instructions further comprise instructions for purging said writing preferences data from said memory upon activating a toggle presented on said preferences screen, and replacing said purged data with default data stored in said memory.

37. A computer readable medium as recited in claim 13 wherein said program instructions further comprise instructions for identifying the user as either a primary user or a guest user to permit selective operation of said pen-based computer in a primary user mode or a guest user mode.

38. A computer readable medium as recited in claim 37 wherein said program instructions further include instructions for saving and updating primary user data in said memory when said user is identified as a primary user.

39. A computer readable medium as recited in claim 38 wherein said program instructions further include instructions for identifying said user as a guest user, updating said guest user handwriting data, and purging said guest user data from said memory when said user is identified as a primary user.

40. A computer readable medium as recited in claim 39 wherein said program instructions further include instructions for updating said adaptive learning data and said handwriting preferences data.

* * * * *